United States Patent
Uchino et al.

(10) Patent No.: US 9,999,006 B2
(45) Date of Patent: Jun. 12, 2018

(54) USER APPARATUS, BASE STATION, UPLINK TRANSMISSION POWER REPORTING METHOD AND PARAMETER NOTIFICATION METHOD

(71) Applicant: NTT DOCOMO, INC., Tokyo (JP)

(72) Inventors: Tooru Uchino, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days. days.

(21) Appl. No.: 15/303,163

(22) PCT Filed: Sep. 24, 2015

(86) PCT No.: PCT/JP2015/076957
§ 371 (c)(1),
(2) Date: Oct. 10, 2016

(87) PCT Pub. No.: WO2016/047698
PCT Pub. Date: Mar. 31, 2016

(65) Prior Publication Data
US 2017/0034793 A1    Feb. 2, 2017

(30) Foreign Application Priority Data

Sep. 25, 2014  (JP) ................ 2014-195889

(51) Int. Cl.
*H04W 52/36*    (2009.01)
*H04W 72/04*    (2009.01)
(Continued)

(52) U.S. Cl.
CPC ......... *H04W 52/365* (2013.01); *H04W 52/34* (2013.01); *H04W 72/0413* (2013.01);
(Continued)

(58) Field of Classification Search
None
See application file for complete search history.

(56) References Cited

U.S. PATENT DOCUMENTS

2014/0112271 A1    4/2014 Pan
2014/0211738 A1*   7/2014 Park ................... H04W 52/365
                                                    370/329

(Continued)

OTHER PUBLICATIONS

International Search Report issued in PCT/JP2015/076957, dated Nov. 24, 2015 (1 page).

(Continued)

*Primary Examiner* — Alejandro Rivero
(74) *Attorney, Agent, or Firm* — Osha Liang LLP

(57) ABSTRACT

A user apparatus in a mobile communication system includes a first and second base station that perform communication with the user apparatus by inter-base station carrier aggregation. The user apparatus receives, from the first base station, a first detection parameter on uplink transmission power reporting set for a first cell group that is a cell group of the first base station. The user apparatus also receives a second detection parameter on uplink transmission power reporting set for a second cell group that is a cell group of the second base station. The user apparatus reports uplink transmission power information to one of or both of the first and second base station when detecting a report trigger of the uplink transmission power information in a cell group of the first and second cell group by a detection parameter of the first and second detection parameter.

4 Claims, 17 Drawing Sheets

(51) Int. Cl.
*H04W 52/34* (2009.01)
*H04W 88/02* (2009.01)
*H04W 88/08* (2009.01)
*H04W 76/02* (2009.01)
*H04W 52/14* (2009.01)

(52) U.S. Cl.
CPC ........ *H04W 52/146* (2013.01); *H04W 76/025* (2013.01); *H04W 88/02* (2013.01); *H04W 88/08* (2013.01)

(56) References Cited

U.S. PATENT DOCUMENTS

| | | | | |
|---|---|---|---|---|
| 2015/0085760 A1* | 3/2015 | Yamada | ................ | H04W 24/10 370/329 |
| 2015/0173047 A1* | 6/2015 | Yamada | .............. | H04W 72/042 370/329 |
| 2015/0215943 A1* | 7/2015 | Vajapeyam | ....... | H04W 72/0473 370/329 |

OTHER PUBLICATIONS

Written Opinion of the International Searching Authority issued in PCT/JP2015/076957, dated Nov. 24, 2015 (4 pages).
Huawei, HiSilicon; "PHR operation for Dual Connectivity"; 3GPP TSG-RAN WG2 Meeting #85, R2-140056; Prague, Czech Republic; Feb. 10-14, 2014 (3 pages).
LG Electronics Inc.; "PHR operation for dual connectivity"; 3GPP TSG-RAN2 Meeting #85, R2-140742; Prague, Czech Republic; Feb. 10-14, 2014 (3 pages).
Samsung; "Power headroom report for inter-ENB CA"; 3GPP TSG RAN WG2 #84, R2-133823; San Francisco, U.S.; Nov. 11-15, 2013 (4 pages).
3GPP TR 36.842 V12.0.0; "3rd Generation Partnership Project; Technical Specification Group Radio Access Network; Study on Small Cell enhancements for E-UTRA and E-UTRAN; Higher layer aspects; (Release 12)"; Dec. 2013 (71 pages).
3GPP TS 36.321 V12.2.0; "3rd Generation Partnership Project; Technical Specification Group Radio Access Network; Evolved Universal Terrestrial Radio Access (E-UTRA); Medium Access Control (MAC) protocol specification (Release 12)"; Jun. 2014 (57 pages).
Japanese Office Action in corresponding Application No. 2014-195889 dated Nov. 24, 2015 (6 pages).
Extended European Search Report issued in corresponding European Patent Application No. 15844043.8, dated Jul. 26, 2017 (13 pages).
Samsung, "Power headroom report for dual connectivity", 3GPP TSG RAN WG2 #85, R2-140328, Prague, Czech Republic, Feb. 10-14, 2014 (4 pages).
Huawei, et al., "PHR Operation in Dual Connectivity", 3GPP TSG-RAN WG2 Meeting #85bis, R2-141155, Valencia, Spain, Mar. 31-Apr. 4, 2014 (3 pages).
Nokia Networks, et al., "PHR for dual connectivity", 3GPP TSG-RAN WG2 Meeting #87, R2-143364, Update of R2-142089, Dresden, Germany, Aug. 18-22, 2014 (8 pages).
Office Action issued in corresponding Korean Patent Application No. 10-2016-7027407, dated Oct. 31, 2017 (8 pages).

* cited by examiner

FIG.4
PRIOR ART

| C7 | C6 | C5 | C4 | C3 | C2 | C1 | R |
|----|----|----|----|----|----|----|---|
| P | V | \multicolumn{5}{c}{PH (Type 2, PCell)} | |
| R | R | \multicolumn{5}{c}{$P_{CMAX,c}$ 1} | |
| P | V | \multicolumn{5}{c}{PH (Type 1, PCell)} | |
| R | R | \multicolumn{5}{c}{$P_{CMAX,c}$ 2} | |
| P | V | \multicolumn{5}{c}{PH (Type 1, SCell 1)} | |
| R | R | \multicolumn{5}{c}{$P_{CMAX,c}$ 3} | |

...

| P | V | PH (Type 1, SCell n) |
|---|---|----------------------|
| R | R | $P_{CMAX,c}$ m |

A Power Headroom Report (PHR) shall be triggered if any of the following events occur:

- *prohibitPHR-Timer* for a CG expires or has expired and the pathloss has changed more than *dl-PathlossChange* dB configured for the CG for at least one activated Serving Cell within the CG which is used as a pathloss reference since the last transmission of a PHR on a serving cell belonging to the CG when the UE has UL resources for new transmission;

- *periodicPHR-Timer* expires;

- upon configuration or reconfiguration of the power headroom reporting functionality by upper layers [8], which is not used to disable the function;

- activation of an SCell with configured uplink.

- *prohibitPHR-Timer* for a CG expires or has expired, when the UE has UL resources for new transmission, and the following is true in this TTI for any of the activated Serving Cells within the CG with configured uplink:

• there are UL resources allocated for transmission or there is a PUCCH transmission on this cell, and the required power backoff due to power management (as allowed by P-MPR$_c$ [10]) for this cell has changed more than *dl-PathlossChange* dB configured for the CG since the last transmission of a PHR on a serving cell belonging to the CG when the UE had UL resources allocated for transmission or PUCCH transmission on this cell.

USER APPARATUS, BASE STATION, UPLINK TRANSMISSION POWER REPORTING METHOD AND PARAMETER NOTIFICATION METHOD

TECHNICAL FIELD

The present invention relates to a technique in which a user apparatus transmits information on uplink transmission power to a base station in a mobile communication system.

BACKGROUND ART

In an LTE system, carrier aggregation (CA: carrier aggregation) for performing communication by simultaneously using a plurality of carriers is adopted, in which a predetermined bandwidth (20 MHz at the maximum) is used as a basic unit. In carrier aggregation, a carrier which is a basic unit is called a component carrier (CC: component carrier).

When CA is performed, a PCell (Primary cell) that is a reliable cell for ensuring connectivity and an SCell (Secondary cell) that is an appendant cell are set for the user apparatus UE. The user apparatus UE connects to a PCell first, and then, an SCell can be added as necessary. The PCell is a cell similar to an independent cell supporting RLM (Radio Link Monitoring) and SPS (Semi-Persistent Scheduling) and the like.

The SCell is a cell which is set in the user apparatus UE by being added to the PCell. Addition and deletion can be performed by RRC (Radio Resource Control) signaling. Since SCell is in an deactivated state right after it is set in the user apparatus UE, communication becomes available (scheduling becomes available) only by activating it.

As shown in FIG. 1, in CA up to Rel-10 of LTE, a plurality of CCs under the same base station eNB are used.

On the other hand, in Rel-12, this is further expanded so that Dual connectivity is proposed in which simultaneous communication is performed by using CCs under different base stations eNB to realize high throughputs (non-patent document 1). That is, in Dual connectivity, the UE performs communication simultaneously using radio resources of two physically different base stations eNB.

Dual connectivity is a kind of CA, and it is also referred to as Inter eNB CA (inter-base station carrier aggregation), in which Master-eNB (MeNB) and Secondary-eNB (SeNB) are introduced. FIG. 2 shows an example of Dual connectivity. In the example of FIG. 2, an MeNB communicates with the user apparatus UE by a CC#1, and the SeNB communicates with the user apparatus UE by a CC#2 so that Dual connectivity (to be referred to as DC hereinafter) is realized.

In DC, a cell group formed by cell(s) (one or a plurality of cells) under an MeNB is called MCG (Master Cell Group), and a cell group formed by cell(s) (one or a plurality of cells) under an SeNB is called SCG (Secondary Cell Group). An UL CC is set in at least one SCell in an SCG, and PUCCH is set in one of the at least one SCell. The SCell is called PSCell (primary SCell). In the following, there is a case where base stations such as MeNB and SeNB are collectively called an eNB.

RELATED ART DOCUMENT

Non Patent Document

[NON PATENT DOCUMENT 1] 3GPP TR 36.842 V12.0.0 (2013-12)

[NON PATENT DOCUMENT 2] 3GPP TS 36.321 V12.2.0 (2014-06)

SUMMARY OF THE INVENTION

Problem to be Solved by the Invention

Since an embodiment of the present invention is on a technique for solving a problem on PHR (power headroom report) in DC, first, a general matter of PHR is described, and after that, a problem on PHR in DC is described. In the present specification, basically, PHR is used as a term meaning to report a PH (power headroom) to the base station eNB. Also, a reported signal is called a PHR signal.

<On PHR>

The transmission power by which the user apparatus UE transmits data to the base station eNB needs to be a proper size. Thus, the user apparatus UE calculates an UL transmission power using a predetermined function, so as to perform UL transmission using the calculated UL transmission power. In the following, an example of the predetermined function is shown.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \quad \text{(equation 1)}$$

In the equation 1, $P_{CMAX,c}(i)$ is the maximum transmission power of an i-th subframe of a serving cell c, $M_{PUSCH,c}(i)$ is the number of resource blocks, $\Delta_{TF,c}$ is a power offset derived from MCS (Modulation Coding Scheme), $PL_c$ is a pathloss, and $f_c(i)$ is an accumulated TPC command. The others are broadcasted parameters.

The user apparatus UE inputs an assigned resource amount, applying MCS and the like to the predetermined function to determine a transmission power and perform UL transmission. When the calculated transmission power exceeds the maximum transmission power, the user apparatus UE performs UL transmission by applying the maximum transmission power.

The base station eNB ascertains a transmission power of the user apparatus UE based on the above-mentioned equation 1 in order to perform power control and scheduling (resource assignment, MCS determination and the like) such that the transmission power of the user apparatus UE becomes a proper value. However, among variables in the above-mentioned equation 1, since the pathloss is unknown, the user apparatus UE transmits a PHR (power headroom report) signal including a PH (power headroom) to the base station eNB based on a predetermined trigger (example: when the pathloss changes by an amount larger than a predetermined value), so that the base station eNB calculates a transmission power of the user apparatus UE based on the PHR signal.

The power headroom (PH) is a value calculated by the following equation 2, and it means a difference between the maximum transmission power of a CC and a transmission power that is currently (at the time of reporting PH) used.

$$PH_{type1,c}(i) = P_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i)\} \quad \text{(equation 2)}$$

FIG. 3A and FIG. 3B are figures showing examples of PHs. FIG. 3A shows a case where the maximum transmission power is larger than the calculated transmission power, in which the PH becomes a positive value. FIG. 3B shows a case where the calculated transmission power is greater than the maximum transmission power. In this case, the actual transmission power becomes the maximum transmission power, in which the PH becomes a negative value.

In LTE, it is defined that the user apparatus UE reports PHs of all active CCs to the base station eNB. For example, in the non-patent document 2, a MAC signal (Extended Power Headroom MAC Control Element) for PH transmission is defined as shown in FIG. 4.

Also, there are report triggers of a PHR signal as follows (non-patent document 2). That is, the user apparatus UE transmits a PHR signal by PUSCH transmission after a following trigger is satisfied. In the following description, information enclosed by [ ] is a parameter transmitted from the base station eNB to the user apparatus by an RRC signaling. By the way, "equal to or greater than" in "equal to or greater than [dl-PathlossChange]" is substantially the same as "greater than".

[PeriodicPHR-Timer] expires.
[ProhibitPHR-Timer] expires, and pathloss change by equal to or greater than [dl-PathlossChange] is observed on at least equal to or greater than one Activated serving cell after the last PHR transmission;
Configuration or Reconfiguration of PHR;
Activation of SCell to which Uplink is configured;
[ProhibitPHR-Timer] expires, and Power-backoff change by equal to or greater than [dl-PathlossChange] is performed on at least equal to or greater than one Activated serving cell after the last PHR transmission.

In DC, a plurality of base stations eNB perform TPC control and scheduling. Therefore, for example, unless the base stations eNB perform assignment while ensuring that there is a room of transmission power that the base station eNB can keep with each other, there is a possibility in that UL transmission power soon lacks so that sufficient throughput cannot be obtained.

However, in the current DC, since dynamic inter-eNB cooperation is difficult, a mechanism is introduced in which a PH is reported separately to each eNB (CG). That is, PHR control is independently set and managed for the MeNB (MCG) and the SeNB (SCG). For example, ProhibitPHR-Timer is launched at a time point when a PHR signal is transmitted to a corresponding eNB (CG).

In DC, in order for an eNB of one side to ascertain Uplink required power of a serving cell belonging to an eNB (CG) of the other side, when the user apparatus UE transmits a PHR signal to an eNB (CG), the user apparatus UE reports PHs of all activated serving cells (including serving cells of the other eNB (CG)). Accordingly, it is possible that an eNB (CG) performs uplink scheduling while checking required power of the other eNB (CG).

As for the before-mentioned PHR triggers, as shown in parentheses in the following, they are broadly divided to ones for reporting PH to both eNBs (CGs) and ones for reporting PH only to corresponding eNB (CG).

PeriodicPHR-Timer expires (reporting only to corresponding eNB (CG));
ProhibitPHR-Timer expires, and pathloss change by equal to or greater than dl-PathlossChange is observed on at least equal to or greater than one Activated serving cell after the last PHR transmission (reporting to both eNBs (CGs));
Configuration or Reconfiguration of PHR (reporting only to corresponding eNB (CG));
Activation of SCell to which Uplink is configured (reporting to both eNBs (CGs));
ProhibitPHR-Timer expires, and Power-backoff change by equal to or greater than dl-PathlossChange is performed on at least equal to or greater than one Activated serving cell after the last PHR transmission (reporting to both eNBs (CGs)).

<Problem on PHR in DC>

As to the function for the user apparatus UE to perform PHR trigger detection and PH reporting, it is assumed that ON (function use)/OFF (function not use) can be set for each eNB by an RRC signaling from the MeNB. In this case, there is a problem in that, when the PHR function for an eNB of one side is turned OFF, the other side of eNB cannot receive a PHR based on Pathloss/P-MPR change (+Activation) in a service cell of a CG which is turned OFF.

That is, as shown in FIG. 5, in a case where the PHR function is ON for both of the MeNB and the SeNB in the user apparatus UE, for example, if the user apparatus UE detects a PHR trigger in a serving cell of an SCG, the PHR signal including PHs of each active CC is transmitted not only to the SeNB but also to the MeNB. Accordingly, the MeNB can execute UL power control of itself by considering pathloss change and the like in the SCG side.

On the other hand, as shown in FIG. 6, in the user apparatus UE, when the PHR function of the MeNB is ON and the PHR function of the SeNB is OFF, for example, even if there is a change of pathloss by equal to or greater than a predetermined value in a serving cell of the SCG, the user apparatus UE does not detect it as a PHR trigger. Thus, transmission of a PHR signal is not performed. Therefore, the MeNB cannot execute UL power control of itself considering pathloss change and the like in the SCG side.

By the way, it's not always true that scheduling policies of both eNBs are common in DC. For example, a case can be considered in which the MeNB includes a macro cell and has responsibility for coverage and mobility, and the SeNB forms a small cell to provide only best effort data. In this case, for example, since the MeNB sensitively follows a change of pathloss, it can be considered to set a value for "dl-PathlossChange" as a value smaller than a setting value in the SeNB (for example, 1 dB for MeNB, 6 dB for SeNB, or the like).

However, like the above-mentioned case, in a case where "dl-PathlossChange" is different between eNBs, there is no conventional technique for the user apparatus UE how to perform PHR trigger control in order to enable each eNB to perform proper uplink transmission power control.

As mentioned above, in the conventional technique, no technique has been proposed for enabling a user apparatus to properly transmit PH (uplink transmission power information) to a base station in response to various settings assumed in DC.

The present invention is contrived in view of the above-mentioned points, and an object of the present invention is to provide a technique for enabling a user apparatus to properly transmit uplink transmission power information to a base station in a mobile communication system including a first base station and a second base station that perform communication with the user apparatus by inter-base station carrier aggregation.

Means for Solving the Problem

According to an embodiment of the present invention, there is provided a user apparatus in a mobile communication system including a first base station and a second base station that perform communication with the user apparatus by inter-base station carrier aggregation, including:

a reception unit configured to receive, from the first base station, a first detection parameter, on uplink transmission power reporting, set for a first cell group that is a cell group of the first base station, and a second detection parameter, on uplink transmission power reporting, set for a second cell group that is a cell group of the second base station; and a report control unit configured to report uplink transmission power information to one of or both of the first base station and the second base station when detecting a report trigger of the uplink transmission power information in a cell group of the first cell group and the second cell group by a detection parameter of the first detection parameter and the second detection parameter.

According to an embodiment of the present invention, there is provided a user apparatus in a communication system including a first base station and a second base station that perform communication with the user apparatus by inter-base station carrier aggregation, including:

a reception unit configured to receive, from the first base station, a detection parameter for detecting a report trigger of uplink transmission power information; and a report control unit configured to report uplink transmission power information to both of the first base station and the second base station when detecting, by the detection parameter, a report trigger in a cell group of a first cell group that is a cell group of the first base station and a second cell group that is a cell group of the second base station.

According to an embodiment of the present invention, there is provided a base station used as a first base station in a communication system including the first base station and a second base station that perform communication with a user apparatus by inter-base station carrier aggregation, including:

a reception unit configured to receive, from the second base station, a desired value of a second detection parameter, on uplink transmission power reporting, determined for a second cell group that is a cell group of the second base station;

a determination unit configured to compare the desired value of the second detection parameter received by the reception unit and a desired value of a first detection parameter, on uplink transmission power reporting, determined for a first cell group that is a cell group of the first base station, to determine a value that is equal to or less than a smaller value between the desired value of the second detection parameter and the desired value of the first detection parameter as a detection parameter for detecting a report trigger of uplink transmission power information; and a notification unit configured to notify the user apparatus of the detection parameter determined by the determination unit.

According to an embodiment of the present invention, there is provided an uplink transmission power reporting method executed by a user apparatus in a mobile communication system including a first base station and a second base station that perform communication with the user apparatus by inter-base station carrier aggregation, including:

a reception step of receiving, from the first base station, a first detection parameter, on uplink transmission power reporting, set for a first cell group that is a cell group of the first base station, and a second detection parameter, on uplink transmission power reporting, set for a second cell group that is a cell group of the second base station; and a report control step of reporting uplink transmission power information to one of or both of the first base station and the second base station when detecting a report trigger of the uplink transmission power information in a cell group of the first cell group and the second cell group by a detection parameter of the first detection parameter and the second detection parameter.

According to an embodiment of the present invention, there is provided an uplink transmission power reporting method executed by a user apparatus in a communication system including a first base station and a second base station that perform communication with the user apparatus by inter-base station carrier aggregation, including:

a reception step of receiving, from the first base station, a detection parameter for detecting a report trigger of uplink transmission power information; and a report control step of reporting uplink transmission power information to both of the first base station and the second base station when detecting, by the detection parameter, a report trigger in a cell group of a first cell group that is a cell group of the first base station and a second cell group that is a cell group of the second base station.

According to an embodiment of the present invention, there is provided a parameter notification method executed by a base station used as a first base station in a communication system including the first base station and a second base station that perform communication with a user apparatus by inter-base station carrier aggregation, including:

a reception step of receiving, from the second base station, a desired value of a second detection parameter, on uplink transmission power reporting, determined for a second cell group that is a cell group of the second base station;

a determination step of comparing the desired value of the second detection parameter received by the reception step and a desired value of a first detection parameter, on uplink transmission power reporting, determined for a first cell group that is a cell group of the first base station, to determine a value that is equal to or less than a smaller value between the desired value of the second detection parameter and the desired value of the first detection parameter as a detection parameter for detecting a report trigger of uplink transmission power information; and a notification step of notifying the user apparatus of the detection parameter determined by the determination step.

Effect of the Present Invention

According to an embodiment of the present invention, there is provided a technique for enabling a user apparatus to properly transmit uplink transmission power information to a base station in a mobile communication system including a first base station and a second base station that perform communication with the user apparatus by inter-base station carrier aggregation.

BRIEF DESCRIPTION OF THE DRAWINGS

FIG. 4 is a diagram showing an example of a signal for reporting power headroom (Extended Power Headroom MAC Control Element);
FIG. 5 is a diagram showing operation when both eNBs are PHR function ON;

FIG. 6 is a diagram showing operation when one side eNB is PHR function ON;

FIG. 14 is a diagram showing a description example of a 3GPP specification;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. Although the present embodiments are targeted for a mobile communication system of LTE, the present invention can be applied not only to LTE but also to other mobile communication systems. Also, in the specification and the claims, the term "LTE" is used to mean Rel-12 of 3GPP, or schemes after Rel-12 unless otherwise stated.

(System Whole Configuration)

Figure 7:
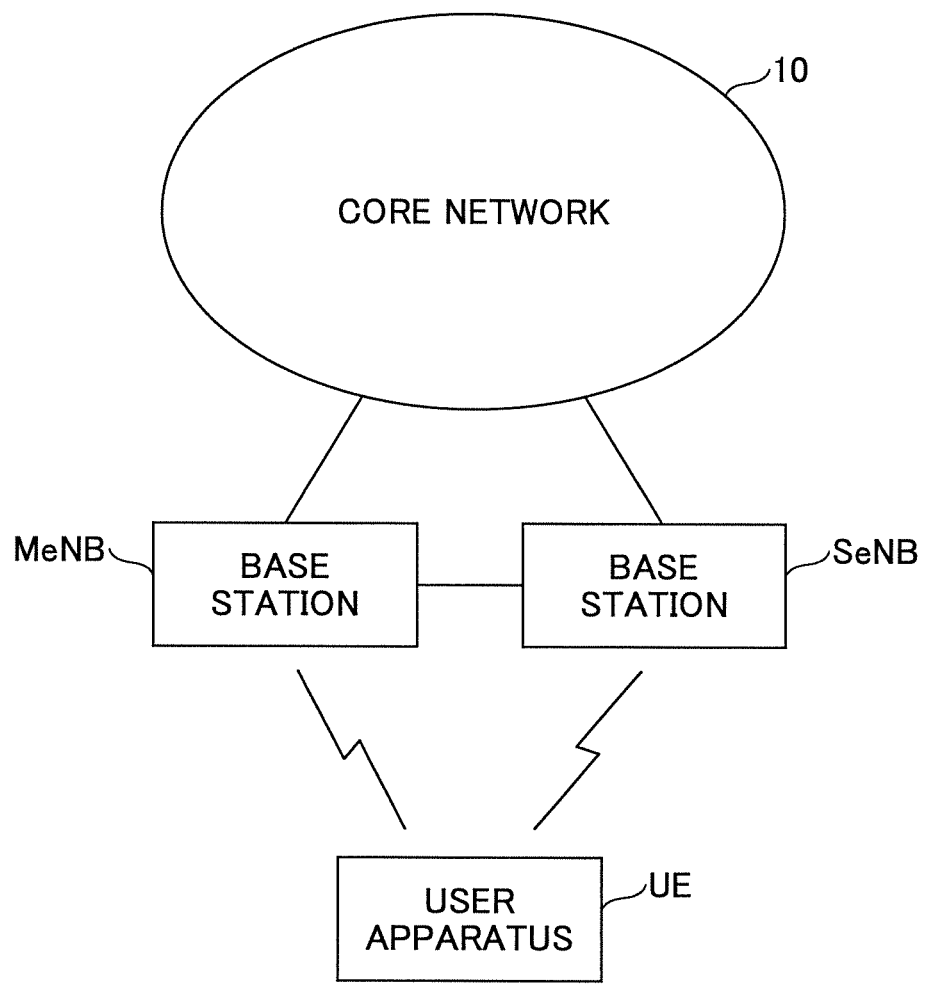
FIG. 7 is a diagram showing a configuration example of a communication system in an embodiment of the present invention.

FIG. 7 shows a configuration example of a mobile communication system of an embodiment of the present invention (common to the first and the second embodiments). As shown in FIG. 7, the mobile communication system of the present embodiment includes a base station MeNB and a base station SeNB each connected to a core network 10, which enables Dual Connectivity (to be referred to as DC, hereinafter) between the base station MeNB/base station SeNB and the user apparatus UE. Also, communication is available between the base station MeNB and the base station SeNB by an X2 interface, for example. In the following, the base station MeNB and the base station SeNB are described as MeNB and SeNB respectively. Also, when collectively mentioning these, or when indicating either MeNB or SeNB, "eNB" is used. Also, there is a case where MeNB and MCG are used synonymously and SeNB and SCG are used synonymously. In the following, a first embodiment and a second embodiment of the present invention are described.

First Embodiment

Figure 1:
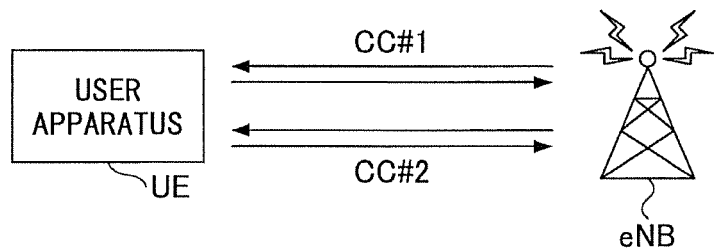
FIG. 1 is a diagram showing a CA up to Rel-10.
Figure 2:
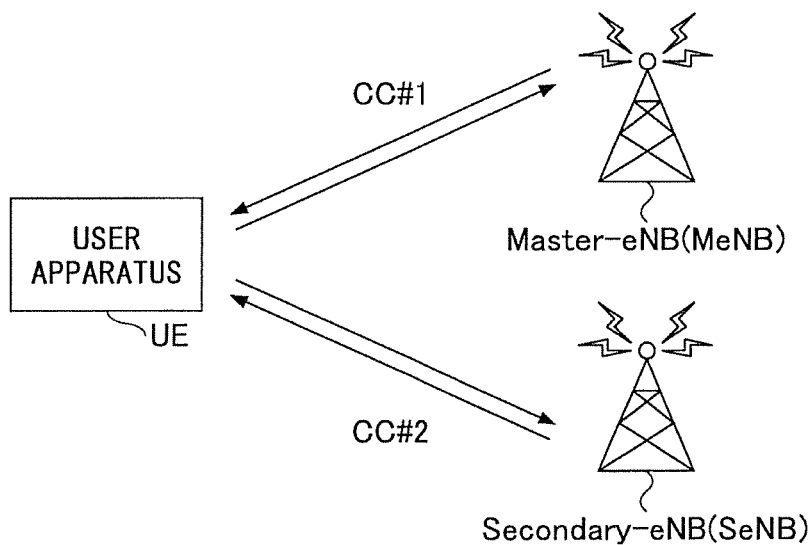
FIG. 2 is a diagram showing an example of Dual Connectivity.
Figure 3A:
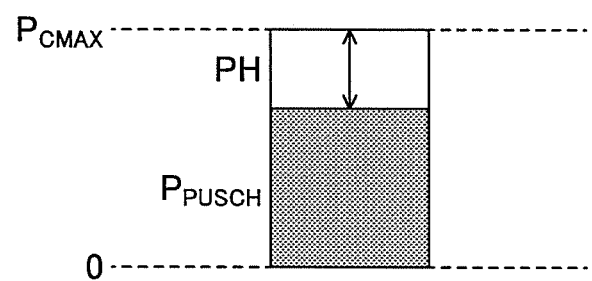
FIG. 3A is a diagram for explaining power headroom.
Figure 3B:
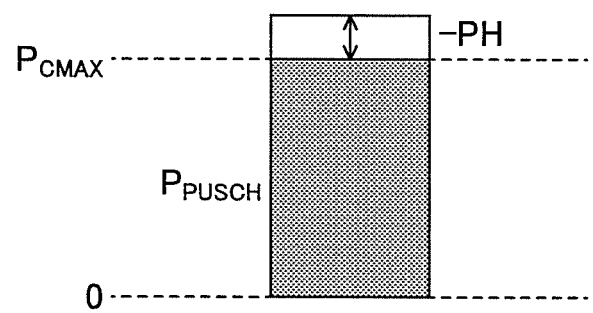
FIG. 3B is a diagram for explaining power headroom.
Figure 5:
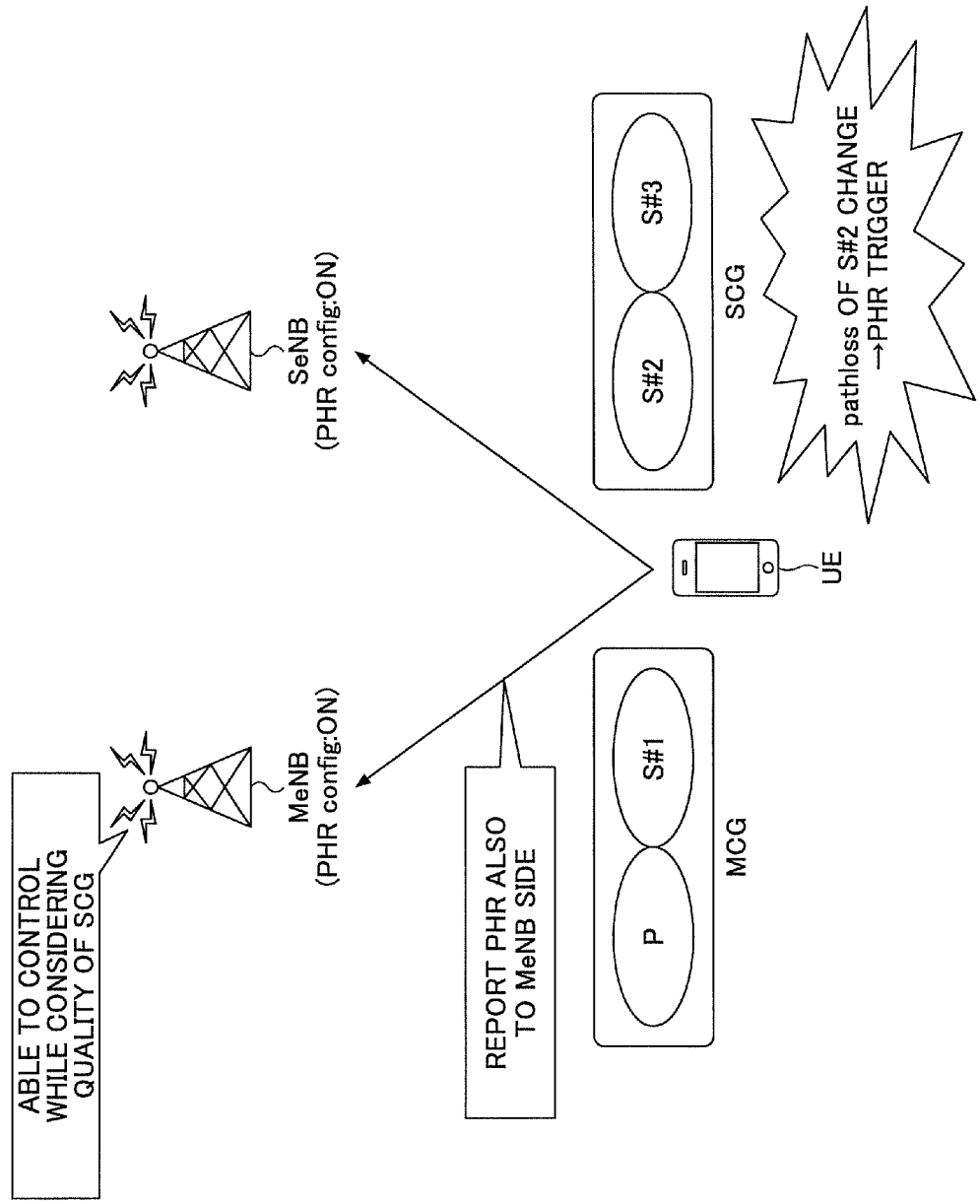
Figure 6:
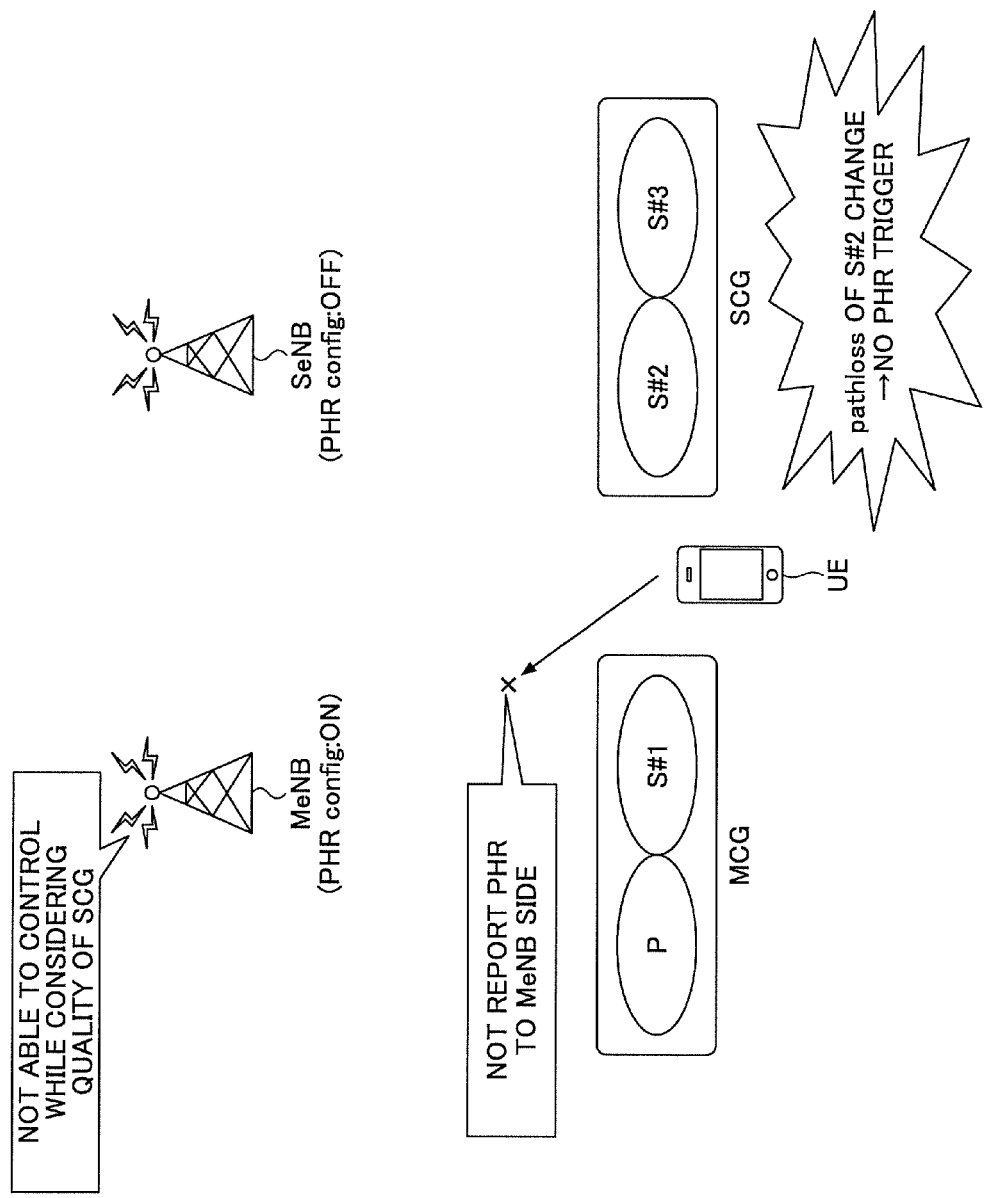

The first embodiment is an embodiment related to a problem described with reference to FIG. 6. In the first embodiment, even when a PHR function of an eNB of one side is OFF, a PH can be reported to the other side of eNB.

An operation outline of the first embodiment is described with reference to FIG. 8. In the example shown in FIG. 8, for the user apparatus UE, OFF is set in the PHR function of the SeNB side, and ON is set in the PHR function of the MeNB side.

In the present embodiment, although the PHR function of the SeNB side is OFF, the user apparatus UE performs detection of a PHR trigger in the same manner as the case in which the PHR function of the SeNB side is ON. However, PHR to the SeNB is not performed.

Figure 8:
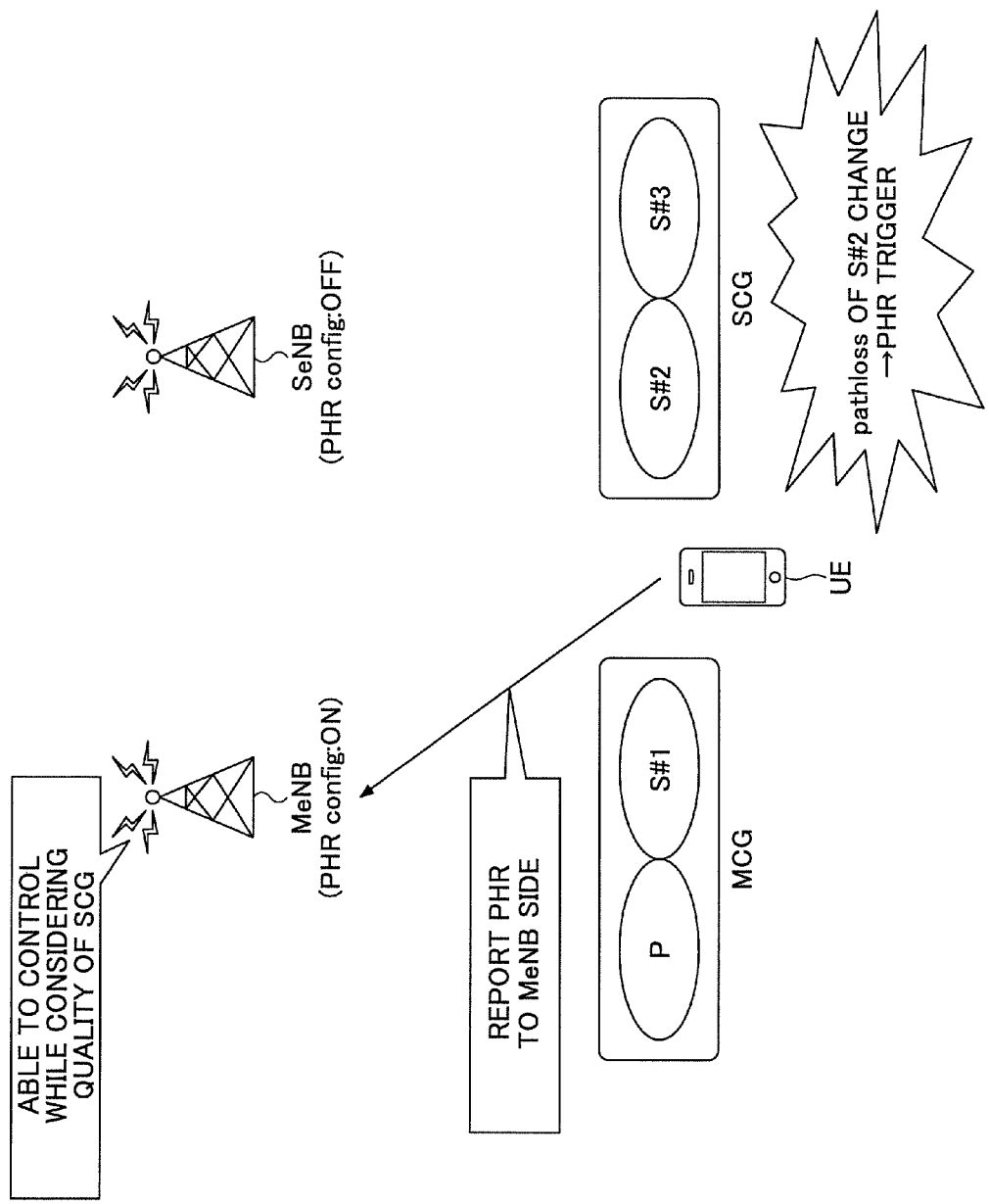
FIG. 8 is a diagram showing operation outline in a first embodiment.

In the example of FIG. 8, since the user apparatus UE detects that pathloss of a serving cell #2 in the SCG changes by equal to or greater than a predetermined value, the user apparatus UE determines to perform PHR, and transmits a PHR signal including a PH of each active CC of the SCG and the MCG to the MeNB. According to such operation, even when the PHR function in the SeNB side is OFF, it becomes possible that the MeNB performs control of UL transmission power while considering quality of the SCG.

Figure 9:
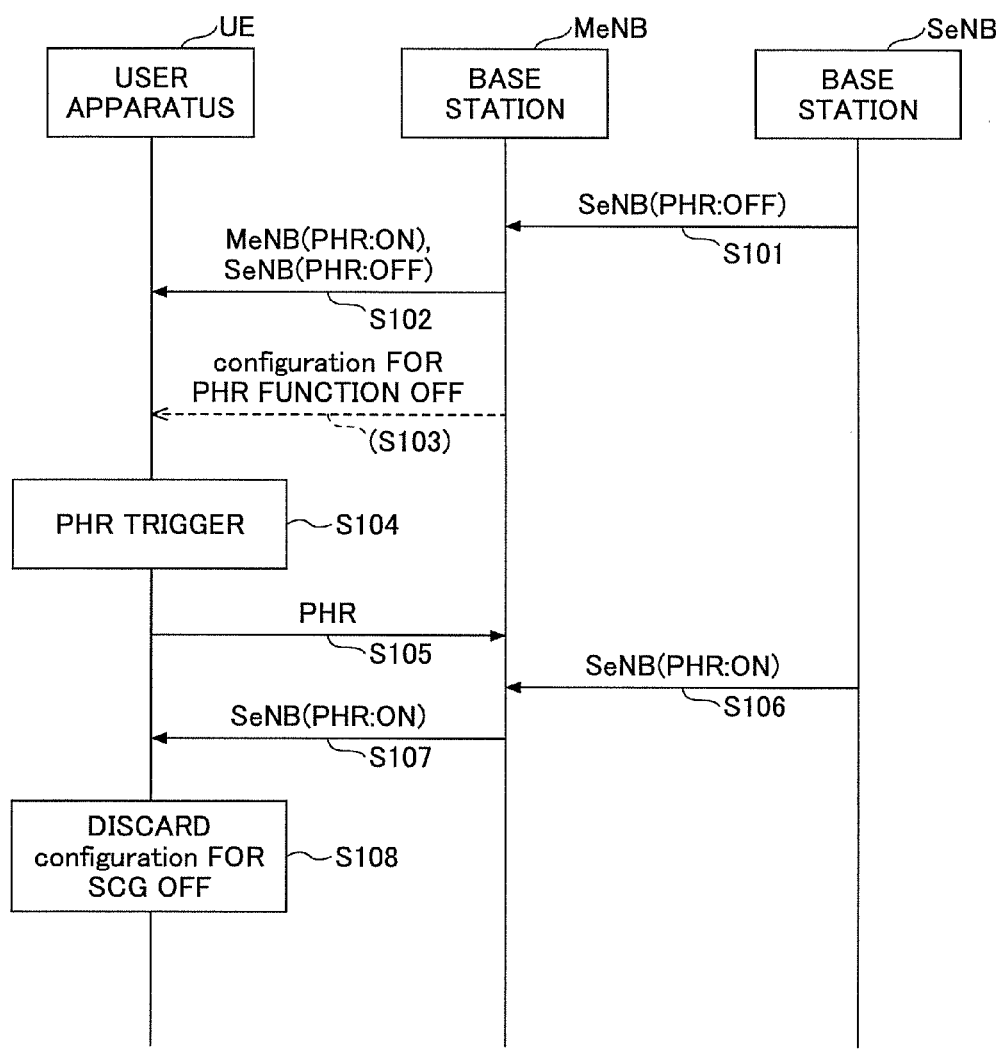
FIG. 9 is a sequence diagram for explaining an operation example in the first embodiment.

Next, an operation example in the first embodiment is described with reference to FIG. 9. As a prerequisite for FIG. 9, it is assumed that the user apparatus UE is configured with DC for performing communication with the MeNB and the SeNB by an RRC signaling from the MeNB. The following steps 101 and 102 may be performed by a signaling message when configuring the DC.

In step 101, setting information for turning the SeNB side PHR function of the user apparatus UE OFF is transmitted from the SeNB to the MeNB. In step 102, the MeNB transmits, to the user apparatus UE, a message (example: RRCConnectionReconfiguration) having setting information for turning the SeNB side PHR function OFF and turning the MeNB side PHR function ON. The message may include a PHR related parameter, such as dl-PathlossChange and the like, for PHR trigger detection. Also, the setting information for turning the PHR function OFF may explicitly include "OFF", or may implicitly include "OFF" by not including "ON".

Also, as indicated in step 103, a PHR related parameter for the SCG side may be notified for use when the SeNB side PHR function is OFF. Also, in the case of notifying of the parameter for PHR function OFF, the parameter may be notified in step 102.

The user apparatus UE that received SeNB side PHR function: OFF/MeNB side PHR function: ON sets (holds) an MeNB side PHR related parameter and also sets (holds) an SeNB side PHR related parameter for detecting a PHR trigger.

In a case where the parameter for SeNB side PHR function OFF is notified in step 103, the user apparatus UE sets the parameter for OFF as the SeNB side PHR related parameter. When the parameter for SeNB side PHR function OFF is not notified, the user apparatus UE may apply the PHR related parameter (threshold used for comparison of change amount of Pathloss/P-MPR, or Periodic Timer) of the MeNB as it is to PHR control in the SCG side.

When the user apparatus UE detects a PHR trigger based on the PHR related parameter in step 104, the user apparatus UE transmits a PHR signal to the MeNB (step 105).

After that, when setting information for turning the SeNB side PHR function ON in the user apparatus UE is transmitted from the SeNB to the MeNB (step 106), the MeNB transmits a message, to the user apparatus UE, including the setting information for tuning the SeNB side PHR function ON (step 107). The user apparatus UE that received the setting information for turning the SeNB side PHR function ON discards setting information (PHR related parameter) used for PHR control in the SCG side (step 108). "Discard" may be to delete information from storage means or may be perform setting not to use the parameter for PHR control in the SCG side.

In the above example, although the PHR function of the MeNB side is turned ON and the PHR function of the SeNB side is turned OFF, similar operation is possible even when ON/OFF is reversed between the MeNB and the SeNB. Also, it is not necessary that setting of ON/OFF of the PHR function is performed in both eNBs at the same time, and the setting may be performed at independent timing for each eNB.

In PHR trigger detection in the first embodiment, a method of the after-mentioned second embodiment (any of the example 1, the example 2, the modified example 1, and the modified example 2) may be used. For example, in the case where the SeNB side PHR function is OFF, when dl-PathlossChange set for the MCG is 1 dB and dl-PathlossChange (for OFF) set for the SCG is 3 dB, the user apparatus UE may detect a PHR trigger when a pathloss change of an SCell of the SCG is greater than 1 dB (dl-PathlossChange set for MCG) to transmit a PHR signal to the MeNB. Not limited to this example, functions described in the first embodiment and functions described in the second embodiment can be arbitrarily combined as long as inconsistency does not occur.

<Configuration Example of User Apparatus UE>

Figure 10:
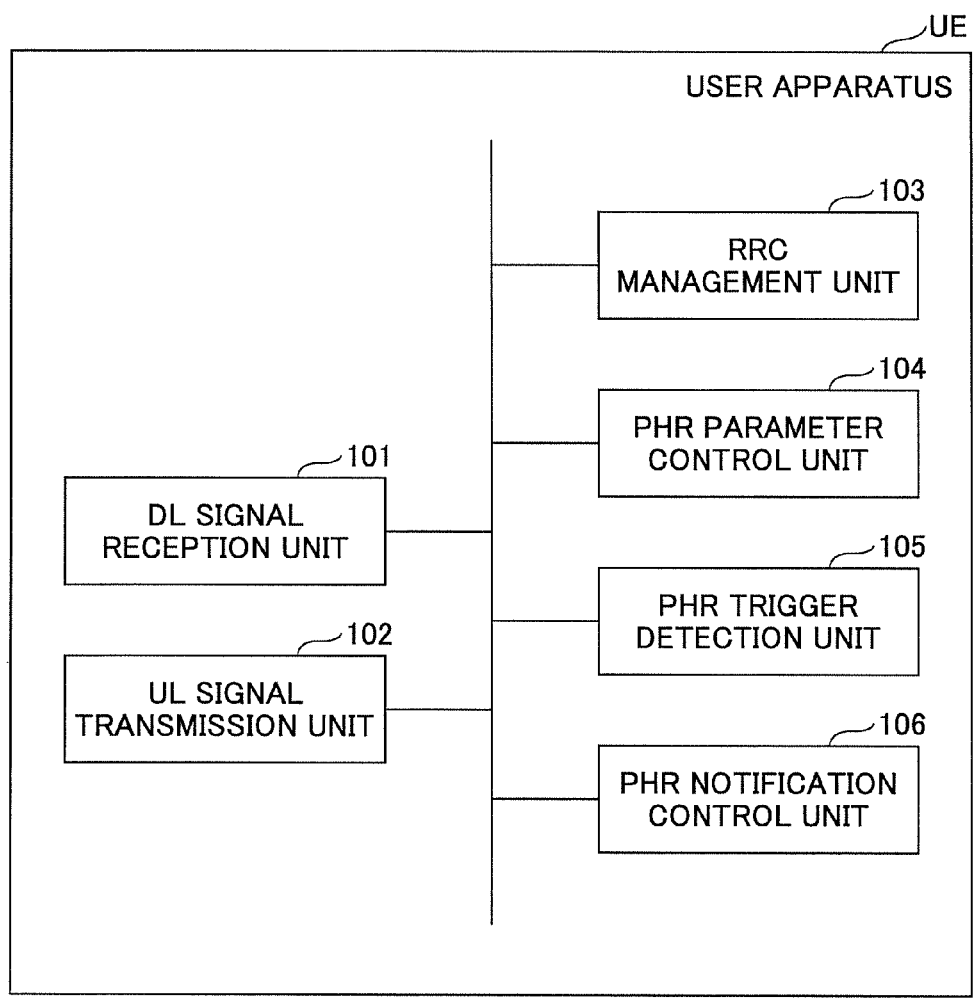
FIG. 10 is a block diagram of a user apparatus UE in the first embodiment.

FIG. 10 shows a configuration example of the user apparatus UE of the first embodiment. As shown in FIG. 10, the user apparatus UE of the present embodiment includes a DL signal reception unit 101, an UL signal transmission unit 102, an RRC management unit 103, a PHR parameter control unit 104, a PHR trigger detection unit 105 and a PHR notification control unit 106. FIG. 10 only shows functional units especially related to the embodiment of the present invention in the user apparatus UE, and the user apparatus UE also includes at least functions, not shown in the figure, for performing as a user apparatus UE in a mobile communication system complying with LTE. Also, the configuration shown in FIG. 10 is merely an example. Any function segmentations and any names of functional units can be used as long as the user apparatus UE can execute processing described in the present embodiment.

The DL signal reception unit 101 receives a radio signal from the base station (MeNB, SeNB) to extract information from the radio signal. The UL signal transmission unit 102 generates a radio signal from transmission information to transmit it to the base station (MeNB, SeNB). The DL signal reception unit 101 and the UL signal transmission unit 102 include a function for performing DC communication with the MeNB and the SeNB.

The RRC management unit 103 receives various setting information such as DC setting information and PHR related parameters by an RRC signaling so as to hold the setting information, and performs configuration based on the setting information The PHR parameter control unit 104 performs setting so as to use a PHR related parameter of an eNB side set to ON for an eNB, of MeNB and SeNB, for which the PHR function is set to OFF. However, in a case where a PHR related parameter for OFF is notified from the MeNB, the PHR related parameter for OFF is applied.

The PHR trigger detection unit 105 detects a trigger of PHR by the method described so far, and when detecting a trigger of PHR, the PHR trigger detection unit 105 instructs the PHR notification control unit 106 to transmit a PHR signal. In response to the PHR trigger, the PHR notification control unit 106 generates PH information for each active CC so as to transmit the PH information as a PHR signal to an eNB for which PHR function is ON from the UL signal transmission unit 102.

According to the present embodiment, there is provided a user apparatus in a mobile communication system including a first base station and a second base station that perform communication with the user apparatus by inter-base station carrier aggregation, including:

a setting information reception unit configured to receive, from the first base station, first setting information for instructing whether to report uplink transmission power information to the first base station, and to receive, from the first base station, second setting information for instructing whether to report uplink transmission power information to the second base station; and a report control unit configured to report uplink transmission power information to the first base station or the second base station when detecting a report trigger for performing reporting of the uplink transmission power information, wherein, even if any of the first setting information and the second setting information received by the setting information reception unit instructs not to perform reporting of the uplink transmission power information, when the report control unit detects a report trigger for a specific base station for which it is instructed not to perform reporting of the uplink transmission power information, the report control unit reports the uplink transmission power information to the other base station.

According to the above-mentioned configuration, in a mobile communication system including a first base station and a second base station that perform communication with a user apparatus by inter-base station carrier aggregation, it becomes possible that the user apparatus properly transmits uplink transmission power information to a base station.

The uplink transmission power information that is reported to the other base station may include uplink transmission power information of a cell of the first base station and uplink transmission power information of a cell of the second base station. According to this configuration, the base station that receives the report can perform uplink transmission power control in consideration of cell quality and the like in the other base station.

The report control unit may apply a parameter for the other base station as a detection parameter for detecting a report trigger for the specific base station for which it is instructed not to perform reporting of uplink transmission power information. According to this configuration, report trigger detection for OFF side can be performed without preparing a detection parameter for detecting a report trigger for the specific base station.

The report control unit may apply a parameter set for the specific base station as a detection parameter for detecting a report trigger for the specific base station for which it is instructed not to perform reporting of uplink transmission power information. According to this configuration, it becomes possible to cause the user apparatus to report uplink transmission power information by using a parameter complying with a policy of the specific base station.

When the user apparatus receives setting information instructing to perform reporting of uplink transmission power information for the specific base station, the user apparatus may discard the detection parameter. According to this configuration, an unnecessary parameter can be discarded quickly so that erroneous operation and the like can be prevented.

The uplink transmission power information is a power headroom, for example. According to this configuration, in DC, it becomes possible that the user apparatus properly notifies the base station of the power headroom.

Second Embodiment

Next, a second embodiment is described. The second embodiment is related to PHR control when a PHR related parameter such as "dl-PathlossChange" and the like is different between eNBs. In the following, although "dl-PathlossChange" is taken as an example as a PHR related parameter, the PHR related parameter to which the technique of the present embodiment can be applied is not limited to "dl-PathlossChange". Also, in the following, unless otherwise specified, it is assumed that the PHR function for each eNB is set to ON.

As an example, in a case where "dl-PathlossChange" is different between eNBs, the user apparatus UE performs PHR trigger detection using "dl-PathlossChange" of the MeNB (MCG) side in a serving cell belonging to the MCG, and performs PHR trigger detection using "dl-PathlossChange" of the SeNB (SCG) side in a serving cell belonging to the SCG. This is an example 1.

Figure 11:
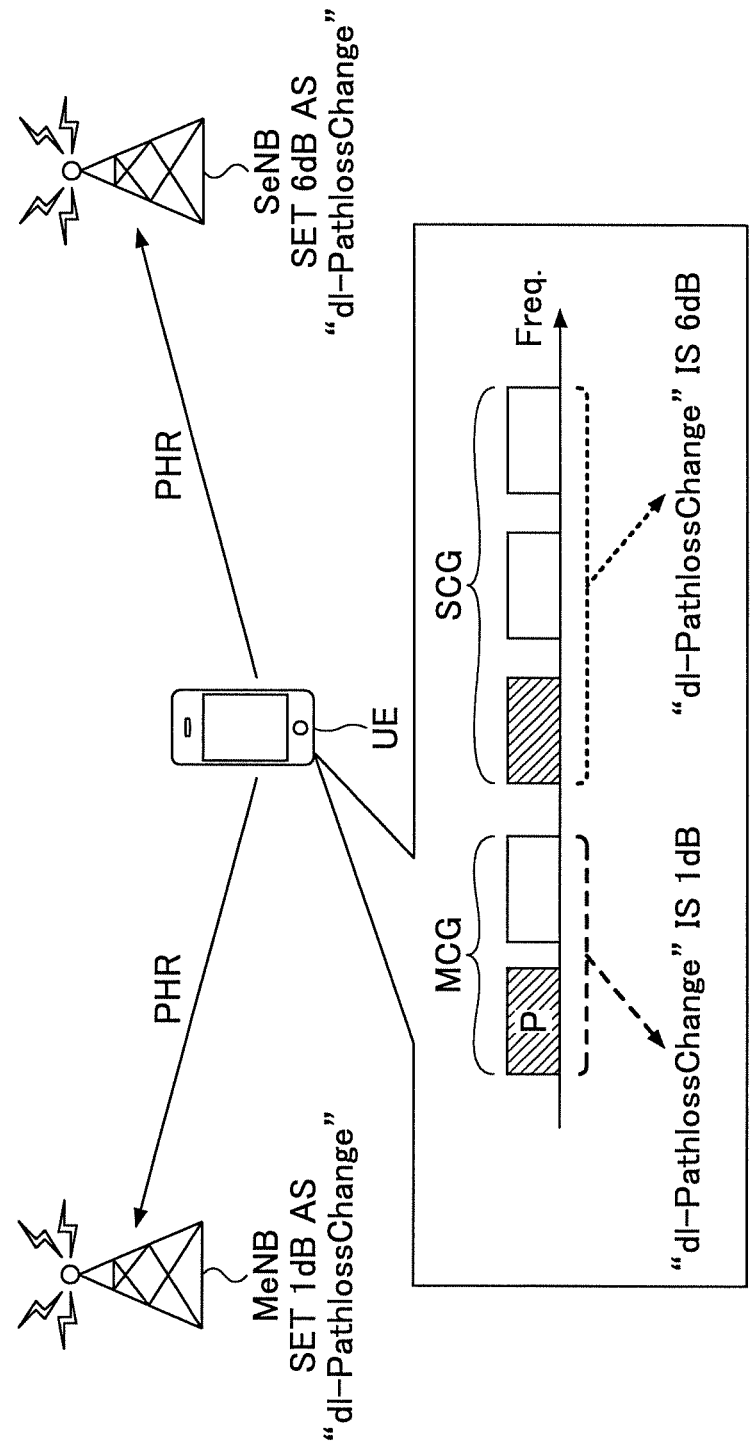
FIG. 11 is a diagram for explaining an operation example when dl-PathlossChange is different

For example, as shown in FIG. 11, a case is considered in which, for the user apparatus UE, 1 dB is set as "dl-PathlossChange" of the MeNB (MCG) side, and 6 dB is set as "dl-PathlossChange" of the SeNB (SCG) side. In this case, for example, when the user apparatus UE detects, as a PHR trigger, that pathloss of an active CC in the MCG changes by equal to or greater than 1 dB, the user apparatus UE transmits a PHR signal including a PH of each active CC of the MCG and the SCG to the MeNB and the SeNB. Also, for example, when the user apparatus UE detects, as a PHR trigger, that pathloss of an active CC in the SCG changes by equal to or greater than 6 dB, the user apparatus UE transmits a PHR signal including a PH of each active CC of the MCG and the SCG to the MeNB and the SeNB.

As for the PHR trigger of the example 1, more specifically, as a description assuming a standard specification (non-patent document 2), it can be described as follows. In the following description, the part enclosed by [ ] indicates changed parts from the existing specification.

ProhibitPHR-Timer [set in a CG] expires and a pathloss change equal to or more than dl-PathlossChange [configured for the CG] is observed for at least one activated Serving Cell [belonging to the CG] since the last transmission of a PHR [of the CG] (report to both eNBs (CGs)).

ProhibitPHR-Timer [set in a CG] expires and a power-backoff change equal to or more than dl-PathlossChange [configured for the CG] is performed for at least one activated Serving Cell [belonging to the CG] since the last transmission of a PHR [of the CG] (report to both eNBs (CGs)).

The above-mentioned example 1 is an example in the second embodiment. However, in the above-mentioned method, although each eNB has a PHR signal transmitted based on a proper trigger for a serving cell that belongs to the eNB (own CG), the eNB has a PHR signal transmitted only by a trigger set by another eNB (another CG) for a serving cell that does not belong to the eNB (own CG).

In the example shown in FIG. 11, if pathloss change or power backoff change occurs by 1 dB only in a service cell belonging to the SCG, a PHR signal is not reported to the MeNB from the user apparatus UE, because "dl-PathlossChange" is 6 dB in the SCG.

In the above example, if the pathloss change is equal to or greater than 6 dB, the PHR signal is reported to the MeNB. However, the MeNB desires to receive a report by the change of 1 dB in order to perform control according to scheduling policy of the MeNB. Thus, it cannot be said that favorable control is performed in the MeNB in the PHR trigger method in the above-mentioned example. That is, there is a possibility in that transmission power control in the MeNB is not performed well so that UL throughput deteriorates. In the following, an example 2 of the second embodiment is described in which the above-mentioned method is improved.

In the example 2 of the second embodiment, MeNB (MCG)/SeNB(SCG) can set respective "dl-PathlossChange". The same is true in the example 1 in this point.

Then, in the example 2, when there is a pathloss change or a power backoff change by equal to or greater than "dl-PathlossChange" set for the MeNB (MCG) in a CC of any eNB (CG), the user apparatus UE detects a trigger of PHR to the MeNB (MCG) to transmit a PHR signal including a PH of each serving cell to the MeNB. At this time, the user apparatus UE may transmit the PHR signal only to the MeNB or may transmit the PHR signal to both of the MeNB and the SeNB.

Also, when there is a pathloss change or a power backoff change by equal to or greater than "dl-PathlossChange" set for the SeNB (SCG) in a CC of any eNB (CG), the user apparatus UE detects a trigger of PHR to the SeNB (SCG) to transmit a PHR signal including a PH of each serving cell to the SeNB. At this time, the user apparatus UE may transmit the PHR signal only to the SeNB or may transmit the PHR signal to both of the SeNB and the MeNB. As an example for transmitting PHR signal only to the SeNB, there is an example in which, in a case where "dl-PathlossChange" is MeNB:3 dB and SeNB:1 dB, for example, when the pathloss of a CC of the MeNB side changes by 1 dB, PHR to the MeNB side is omitted so that PHR only to the SeNB side is performed.

Figure 12:
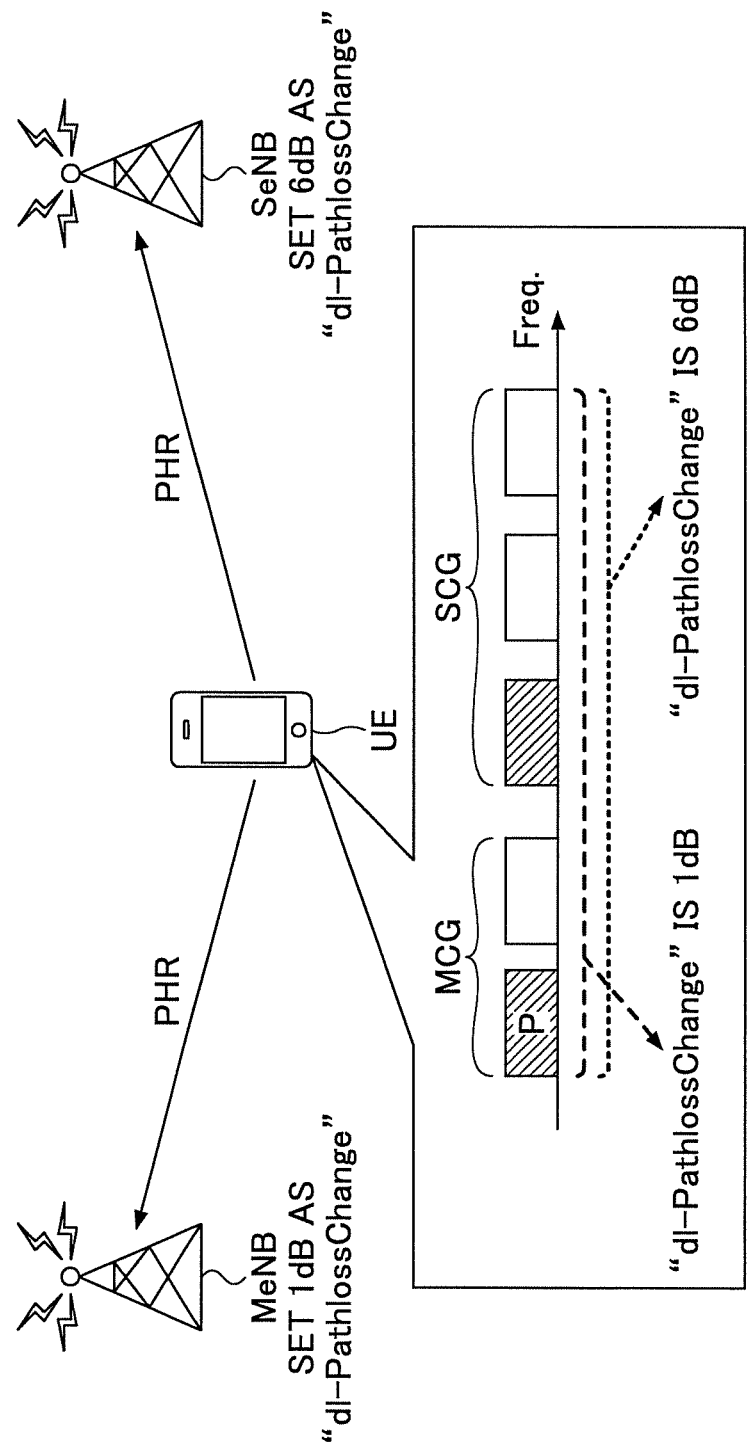
FIG. 12 is a diagram showing operation outline in a second embodiment.

For example, as shown in FIG. 12, a case is considered in which 1 dB is set as "dl-PathlossChange" in the MeNB (MCG) side, and 6 dB is set as "dl-PathlossChange" in the SeNB (SCG) side. In this case, for example, when the user apparatus UE detects, as a PHR trigger, that pathloss of an active CC in the SCG changes by equal to or greater than 1 dB, the user apparatus UE transmits, to the MeNB, a PHR signal including a PH of each active CC of the MCG and the SCG. Also, for example, when the user apparatus UE detects, as a PHR trigger, that pathloss of an active CC in the MCG changes by equal to or greater than 6 dB, the user apparatus UE transmits, to the MeNB and the SeNB, a PHR signal including a PH of each active CC of the MCG and the SCG. In the latter case, even in a case where the user apparatus UE transmits a PHR signal only to an eNB that meets the condition, when pathloss change becomes equal to or greater than 6 dB (SeNB side condition), since it also satisfies equal to or greater than 1 dB (MeNB side condition), the PHR signal is transmitted to both of the MeNB and the SeNB.

Figure 13:
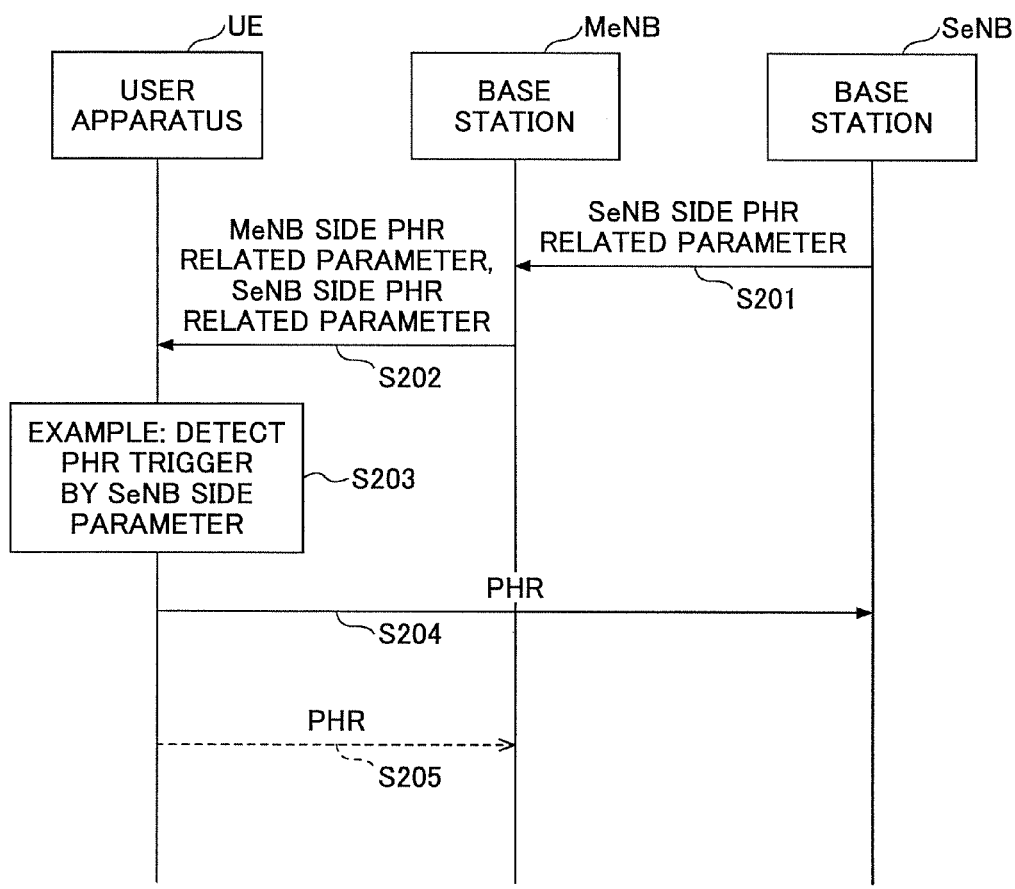
FIG. 13 is a sequence diagram for explaining an operation example in the second embodiment.

A sequence example in the example 2 is described with reference to FIG. 13. In step 201, an SeNB side PHR related parameter (dl-PathlossChange and the like) is notified from the SeNB to the MeNB. In step 202, the MeNB notifies the user apparatus UE of a message (example: RRCConnection- Reconfiguration) including an MeNB side PHR related parameter and the SeNB side PHR related parameter.

In step 203, the user apparatus UE detects a PHR trigger by the SeNB side dl-PathlossChange (smaller than MeNB side dl-PathlossChange). In step 204, the user apparatus UE transmits a PHR signal to the SeNB. As indicated in step 205, the PHR signal may be transmitted to the MeNB in addition to the SeNB.

As described above, by the example 2, the timing of PHR can be improved so that UL throughput can be improved.

Regarding the PHR trigger of the above-mentioned example 2, more specifically, as a description assuming a standard specification (non-patent document 2), it can be described as follows. In the following description, the part enclosed by [ ] indicates changed parts from the existing specification. Also, an example of change of specification corresponding to the following description is shown in FIG. 14. In the following example, although PHR is performed to both eNBs when there is a trigger, PHR to an eNB that does not satisfy the condition may be omitted as described before.

ProhibitPHR-Timer [set in a CG] expires and a pathloss change equal to or more than dl-PathlossChange [configured for the CG] is observed for at least one or more activated Serving Cell [belonging to any CG] since the last transmission of a PHR [of the CG] (report to both eNBs (CGs)).

ProhibitPHR-Timer [set in a CG] expires and a power-backoff change equal to or more than dl-PathlossChange [configured for the CG] is performed for at least one or more activated Serving Cell [belonging to any CG] since the last transmission of a PHR [of the CG] (report to both eNBs (CGs)).

Modified Example 1 of the Second Embodiment

It can be assumed that, in DC, only one value of a PHR related parameter (which is "dl-PathlossChange" in this example) is notified from an eNB to the user apparatus UE. For example, in FIG. 13, if there is no parameter notification from the SeNB to the MeNB in step 201, it can be considered that only a parameter of the MeNB side is transmitted to the user apparatus UE.

In the modified example 1, in the case where only one "dl-PathlossChange" is notified, the user apparatus UE regards the one value as a value of the parameter "dl-PathlossChange" for both of the eNBs (CGs) so as to perform PHR detection according to the above mentioned method of the example 2.

Figure 15:
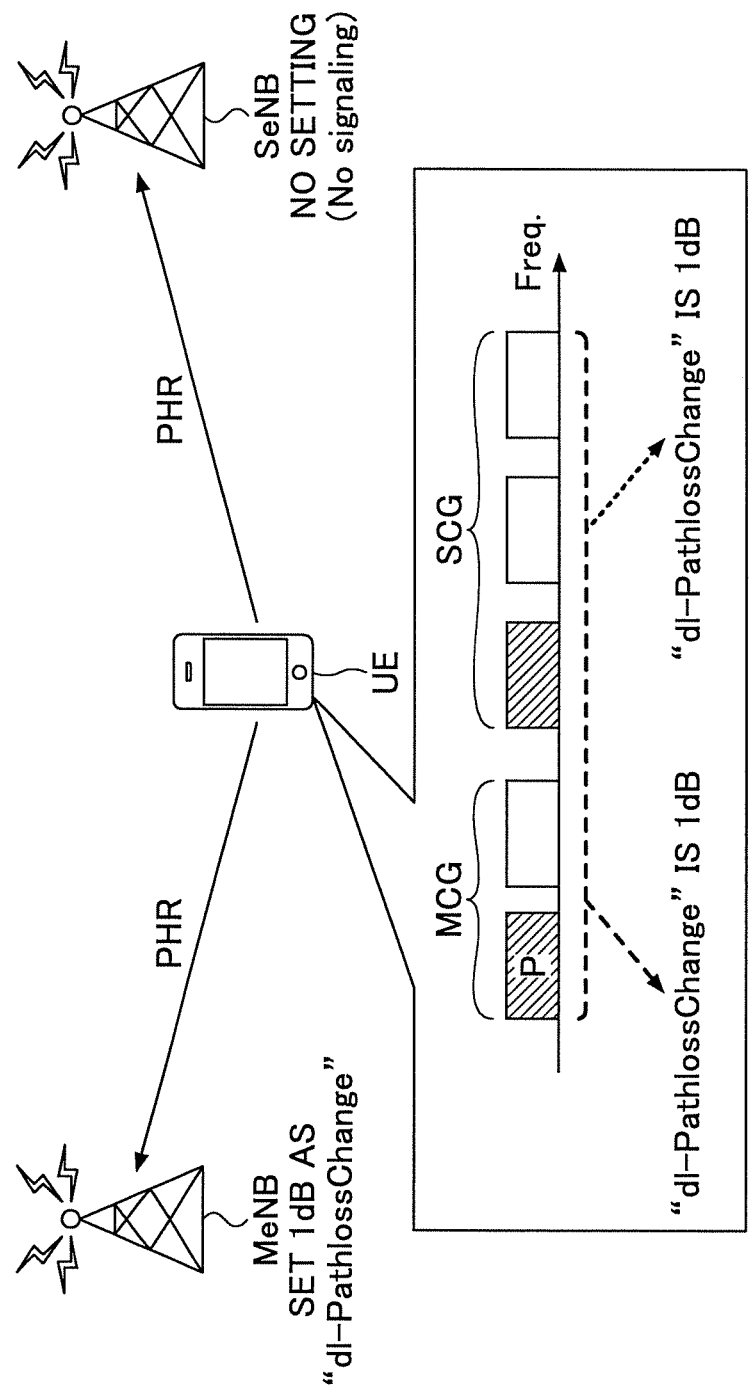
FIG. 15 is a diagram for explaining a modified example 1 in the second embodiment.

That is, for example, as shown in FIG. 15, a case is considered in which 1 dB is set for the user apparatus UE as one "dl-PathlossChange". In this case, for example, when the user apparatus UE detects, as a PHR trigger, that pathloss of an active CC in the SCG changes by equal to or greater than 1 dB, the user apparatus UE transmits a PHR signal including a PH of each active CC of the MCG and the SCG to the MeNB and the SeNB. Even in a case where the user apparatus UE transmits the PHR signal only to an eNB that meets the condition, since the case where the pathloss change becomes equal to or greater than 1 dB satisfies conditions of both of the MeNB and the SeNB, the PHR signal is transmitted to both of the MeNB and the SeNB.

According to the modified example 1, when the MeNB and the SeNB desires the same value as "dl-PathlossChange", overhead can be decreased.

Modified Example 2 in the Second Embodiment

In the modified example 2, although the MeNB and the SeNB may determine respective values as the PHR related parameter (which is "dl-PathlossChange" in this example), "dl-PathlossChange" set in the user apparatus UE is a common value between the eNBs (CGs).

For example, when the SeNB notifies the MeNB of a desired "dl-PathlossChange", the MeNB notifies the user apparatus UE of a smaller value between "dl-PathlossChange" notified from the SeNB and "dl-PathlossChange" of itself (MeNB) (or a value equal to or less than the smaller value) as a common value between the eNBs. The user apparatus UE that is notified of the one "dl-PathlossChange" performs PHR trigger detection and the like in the same way as the modified example 1.

As an example, in a case where the desired value of the MeNB is 6 dB and the desired value of the SeNB is 3 dB, the MeNB notifies the user apparatus UE of 3 dB (or a value less than 3 dB). Also, for example, in a case where the desired value of the MeNB is 3 dB and the desired value of the SeNB is 6 dB, the MeNB notifies the user apparatus UE of 3 dB (or a value less than 3 dB).

In a case where it is assumed that the desired value of the MeNB is always smaller than the desired value of the SeNB, the determination operation of the MeNB in the modified example 2 corresponds to determining a value smaller than "dl-PathlossChange" desired by SeNB as a common value between eNBs.

Figure 16:
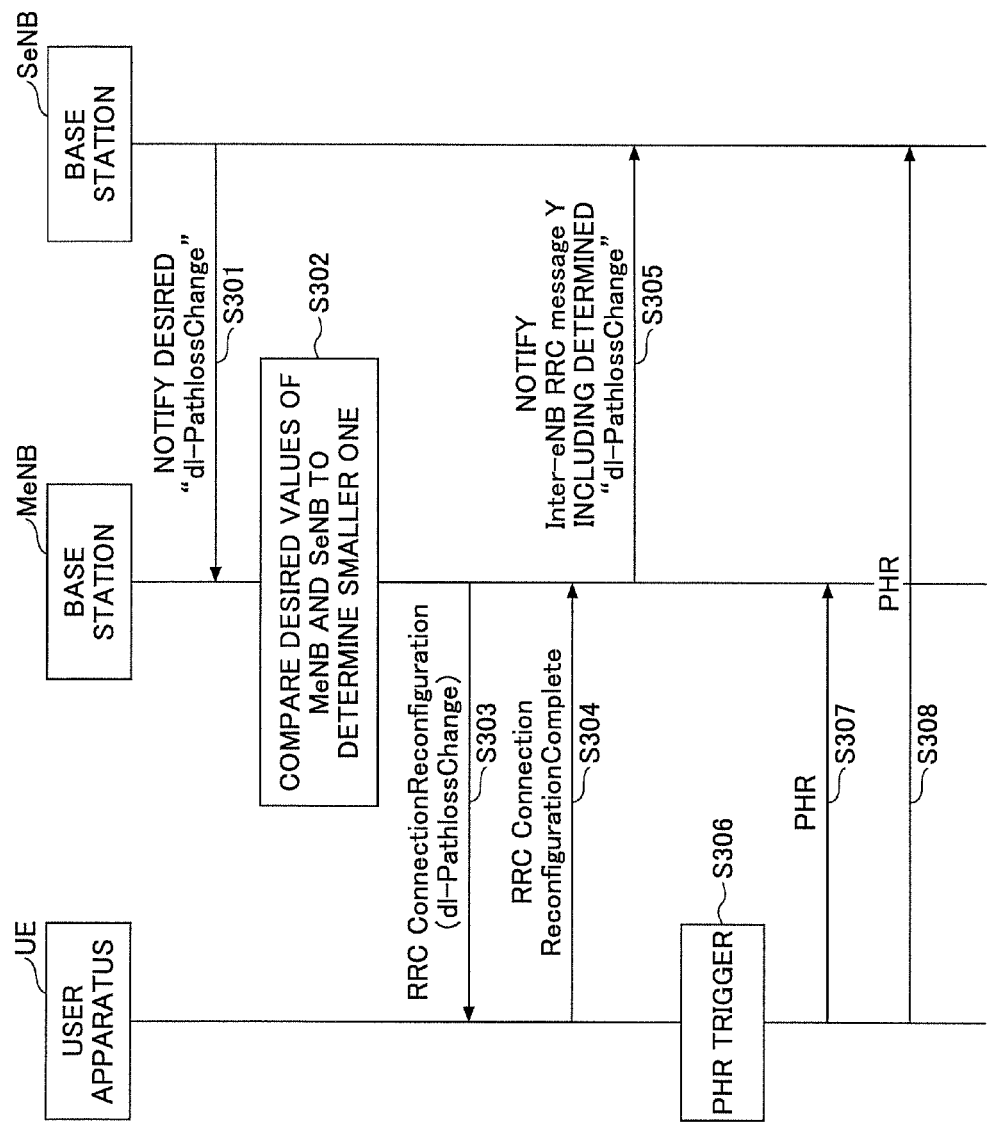
FIG. 16 is a diagram for explaining a modified example 2 in the second embodiment.

A sequence example of the modified example 2 is described with reference to FIG. 16. In step 301, a desired "dl-PathlossChange" is notified from the SeNB to the MeNB. In step 302, the MeNB compares the desired value of the MeNB and a desired value of the SeNB to determine a smaller "dl-PathlossChange" value to be a common value between eNBs.

In step 303, the MeNB transmits a message (RRCConnectionReconfiguration) including the determined "dl-PathlossChange" to the user apparatus UE. When the user apparatus UE completes configuring of parameters including "dl-PathlossChange", the user apparatus UE transits a completion message (RRCConnectionReconfiguration-Complete) to the MeNB (step 304).

In step 305, the MeNB notifies the SeNB of an Inter-eNB RRC message Y including the determined "dl-PathlossChange". After that, for example, in step 306, the user apparatus UE detects a PHR trigger by "dl-PathlossChange" that is common between eNBs. In steps 307 and 308, the user apparatus UE transmits the PHR signal to the MeNB and the SeNB.

In the above-example, although the SeNB notifies the MeNB of the desired value, in reverse, the MeNB may notify the SeNB of a desired value so that the SeNB may compare a desired value of itself and the desired value of the MeNB so as to determine a smaller value (or a value equal to or less than the smaller value) as a common value between eNBs. The determined value may be transmitted to the user apparatus UE from the SeNB, or the SeNB may transmit the determined value to the MeNB so that the MeNB transmits the value to the user apparatus UE.

In the modified example 2, the requirement of an eNB having a desired value of "dl-PathlossChange" by which PHR frequency becomes the highest can be satisfied, and UL throughput improvement effect can be obtained by adjustment of PHR timing. Also, overhead can be reduced since the eNB signals only one value to the user apparatus UE.

<Configuration Example of User Apparatus UE>

Figure 17:
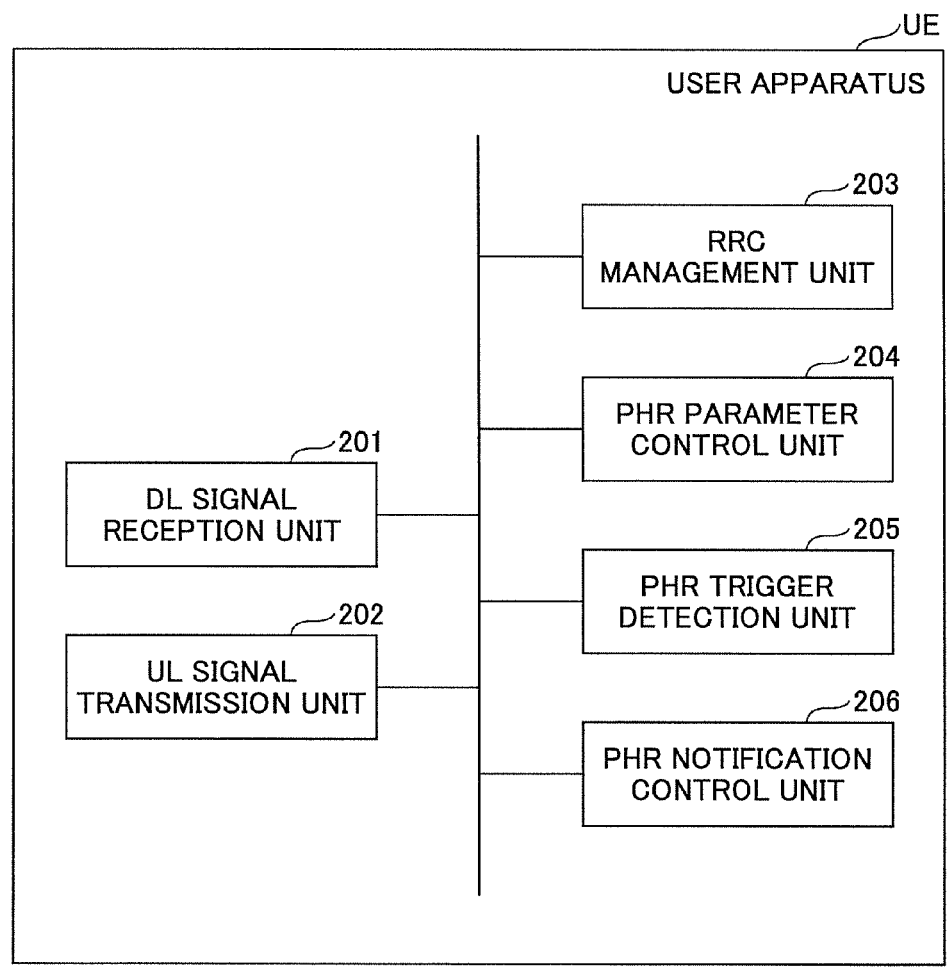
FIG. 17 is a block diagram of a user apparatus UE in the second embodiment.

FIG. 17 shows a configuration example of the user apparatus UE of the second embodiment (including the example 1, the example 2, the modified example 1, the modified example 2). As shown in FIG. 17, the user apparatus UE of the present embodiment includes a DL signal reception unit 201, an UL signal transmission unit 202, an RRC management unit 203, a PHR parameter control unit 204, a PHR trigger detection unit 205 and a PHR notification control unit 206. FIG. 17 only shows functional units especially related to the embodiment of the present invention in the user apparatus UE, and the user apparatus UE also includes at least functions, not shown in the figure, for performing as a user apparatus UE in a mobile communication system complying with LTE. Also, the configuration shown in FIG. 17 is merely an example. Any function segmentations and any names of functional units can be used as long as the user apparatus UE can execute processing described in the present embodiment.

The DL signal reception unit 201 receives a radio signal from the base station (MeNB, SeNB) to extract information from the radio signal. The UL signal transmission unit 202 generates a radio signal from transmission information to transmit it to the base station (MeNB, SeNB). The DL signal reception unit 201 and the UL signal transmission unit 202 include a function for performing DC communication with the MeNB and the SeNB.

The RRC management unit 203 receives various setting information such as DC setting information and PHR related parameters by an RRC signaling from the MeNB to hold the setting information, and performs configuration based on the setting information In the modified examples 1 and 2, in a case where the PHR parameter control unit 204 receives only one parameter (example: "dl-PathlossChange") from the MeNB, the PHR parameter control unit 204 performs setting for using the "dl-PathlossChange" as a parameter for each of the MeNB side and the SeNB side.

Also, the second embodiment and the first embodiment may be carried out by combining them, and the PHR parameter control unit 204 may include a function configured to perform setting so as to use a PHR related parameter of an eNB side set to ON for an eNB, of MeNB and SeNB, in which the PHR function is set to OFF. In this case, in a case where a PHR related parameter for OFF is notified from the MeNB, the PHR related parameter for OFF is applied.

The PHR trigger detection unit 205 detects a trigger of PHR by the method described in the second embodiment (including example 1, example 2, modified example 1, and modified example 2), and when detecting a trigger of PHR, the PHR trigger detection unit 205 instructs the PHR notification control unit 206 to transmit a PHR signal. The PHR trigger detection unit 205 may include a PHR trigger detection function described in the first embodiment.

In response to the PHR trigger, the PHR notification control unit 206 generates PH information for each CC so as to transmit the PH information as a PHR signal to an eNB in which PHR function is ON from the UL signal transmission unit 202.

<Base Station eNB>

Figure 18:
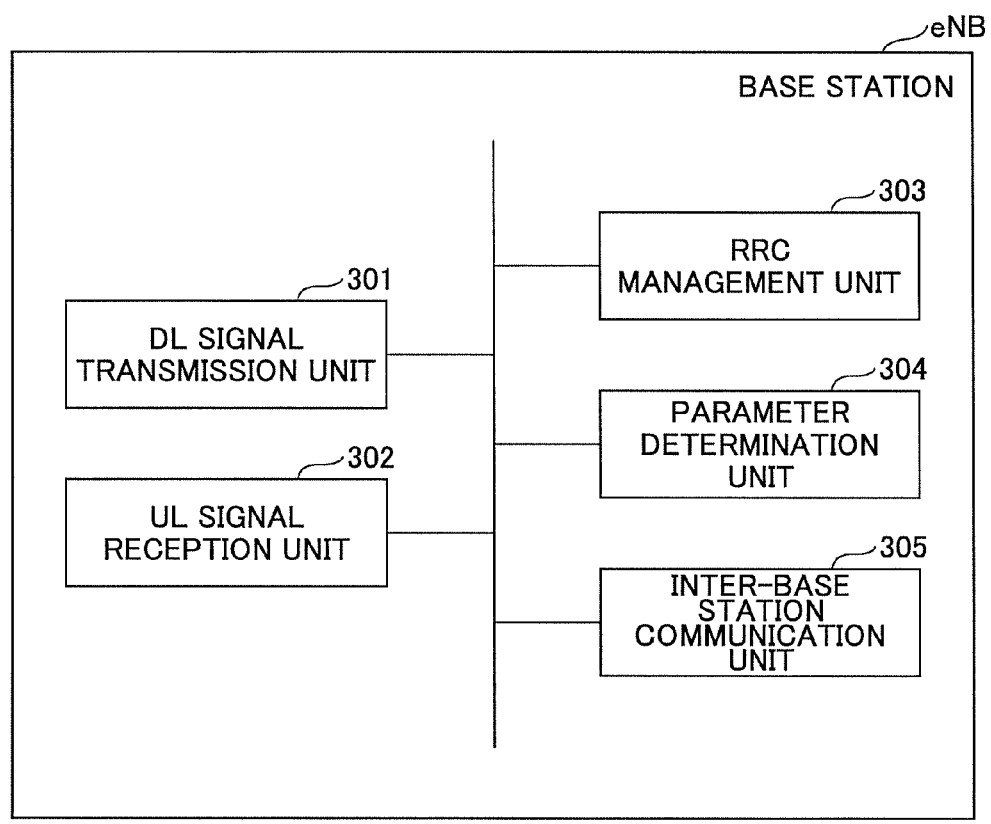
FIG. 18 is a block diagram of a base station eNB in the second embodiment.

FIG. 18 shows a functional block diagram of a base station (which can be applied to any of MeNB and SeNB) of the present embodiment (modified example 2, especially). As shown in FIG. 18, the base station eNB includes a DL signal transmission unit 301, an UL signal reception unit 302, an RRC management unit 303, a parameter determination unit 304 and an inter-base station communication unit 305. FIG. 18 only shows functional units especially related to the embodiment of the present invention in the user apparatus UE, and the base station eNB also includes at least functions, not shown in the figure, for performing operation complying with LTE. Also, the configuration shown in FIG. 18 is merely an example. Any function segmentations and any names of functional units can be used as long as the base station eNB can execute processing described in the present embodiment.

The DL signal transmission unit 301 includes functions configured to generate various signals of physical layer from upper layer information that should be transmitted from the base station eNB and to transmit the signals to the user apparatus UE. The UL signal reception unit 302 includes functions configured to receive various uplink signals from the user apparatus UE to obtain upper layer information from the received physical layer signal. Also, the DL signal transmission unit 301 and the UL signal reception unit 302 include a function for performing DC communication with the user apparatus UE.

The RRC management unit 303 holds, determines, and manages various RRC parameters, and performs transmission and reception with another eNB that forms DC and with the user apparatus UE. When performing communication with the other eNB, the RRC management unit 303 performs communication via the inter-base station communication unit 305.

As described in the modified example 2, the parameter determination unit 304 compares a desired value of "dl-PathlossChange" of the own eNB and a desired value of the other eNB so as to determine the smaller "dl-PathlossChange" value (or a value equal to or less than the smaller value) as a common value between the eNBs. The determined value is transmitted from the DL signal transmission unit 301 to the user apparatus UE by an RRC signaling message, for example.

According to the present embodiment, there is provided a user apparatus in a mobile communication system including a first base station and a second base station that perform communication with the user apparatus by inter-base station carrier aggregation, including:

a reception unit configured to receive, from the first base station, a first detection parameter, on uplink transmission power reporting, set for a first cell group that is a cell group of the first base station, and a second detection parameter, on uplink transmission power reporting, set for a second cell group that is a cell group of the second base station; and a report control unit configured to report uplink transmission power information to one of or both of the first base station and the second base station when detecting a report trigger of the uplink transmission power information in a cell group of the first cell group and the second cell group by a detection parameter of the first detection parameter and the second detection parameter.

According to the above-mentioned configuration, in a mobile communication system including a first base station and a second base station that perform communication with a user apparatus by inter-base station carrier aggregation, it becomes possible that the user apparatus properly transmits uplink transmission power information to a base station.

When detecting the report trigger by the first detection parameter, the report control unit may report the uplink transmission power information to the first base station, and when detecting the report trigger by the second detection parameter, the report control unit may report the uplink transmission power information to the second base station. According to this configuration, each base station can receive a report of uplink transmission power information at a frequency suitable for the own policy.

Also, according to the present embodiment, there is provided a user apparatus in a communication system including a first base station and a second base station that perform communication with the user apparatus by inter-base station carrier aggregation, including:

a reception unit configured to receive, from the first base station, a detection parameter for detecting a report trigger of uplink transmission power information; and a report control unit configured to report uplink transmission power information to both of the first base station and the second base station when detecting, by the detection parameter, a report trigger in a cell group of a first cell group that is a cell group of the first base station and a second cell group that is a cell group of the second base station.

According to the above-mentioned configuration, in a mobile communication system including a first base station and a second base station that perform communication with a user apparatus by inter-base station carrier aggregation, it becomes possible that the user apparatus properly transmits uplink transmission power information to a base station.

The uplink transmission power information that is reported may include uplink transmission power information of a cell in the first base station, and uplink transmission power information of a cell in the second base station. According to this configuration, the base station that receives the report can perform uplink transmission power control in consideration of cell quality and the like in the other base station.

The uplink transmission power information is a power headroom, for example. According to this configuration, in DC, it becomes possible that the user apparatus properly notifies the base station of the power headroom.

Also, according to the present embodiment, there is provided a base station used as a first base station in a communication system including the first base station and a second base station that perform communication with a user apparatus by inter-base station carrier aggregation, including:

a reception unit configured to receive, from the second base station, a desired value of a second detection parameter, on uplink transmission power reporting, determined for a second cell group that is a cell group of the second base station;

a determination unit configured to compare the desired value of the second detection parameter received by the reception unit and a desired value of a first detection parameter, on uplink transmission power reporting, determined for a first cell group that is a cell group of the first base station, to determine a value that is equal to or less than a smaller value between the desired value of the second detection parameter and the desired value of the first detection parameter as a detection parameter for detecting a report trigger of uplink transmission power information; and a notification unit configured to notify the user apparatus of the detection parameter determined by the determination unit.

According to the above-mentioned configuration, in a mobile communication system including a first base station and a second base station that perform communication with a user apparatus by inter-base station carrier aggregation, it becomes possible that the user apparatus properly transmits uplink transmission power information to a base station.

In a case where the notification unit transmits the detection parameter to the user apparatus and receives a completion response from the user apparatus, the notification unit may notify the second base station of the detection parameter. According to this configuration, the second base station can ascertain the detection parameter determined in the first base station.

The user apparatus UE described in the present embodiments (first and second embodiments) may include a CPU and a memory and may be realized by executing a program by the CPU (processor), or may be realized by hardware such as hardware circuits including logics of processing described in the present embodiments, or may be configured by coexistence of a program and hardware.

The base station eNB described in the present embodiments (first and second embodiments) may include a CPU and a memory and may be realized by executing a program by the CPU (processor), or may be realized by hardware such as hardware circuits including logics of processing described in the present embodiments, or may be configured by coexistence of a program and hardware.

In the above, the embodiment of the present invention has been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the base station eNB have been explained by using functional block diagrams. However, such an apparatus may be implemented in hardware (example: circuit), software, or a combination thereof.

Each of the software executed by a processor provided in the user apparatus UE according to an embodiment of the present invention and the software executed by a processor provided in the base station eNB may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2014-195889, filed in the JPO on Sep. 25, 2014, and the entire contents of the Japanese patent application No. 2014-195889 are incorporated herein by reference.

DESCRIPTION OF REFERENCE SIGNS

MeNB, SeNB base station
UE user apparatus
101 DL signal reception unit
102 UL signal transmission unit
103 RRC management unit
104 PHR parameter control unit
105 PHR trigger detection unit 106 PHR notification control unit
201 DL signal reception unit
202 UL signal transmission unit
203 RRC management unit
204 PHR parameter control unit
205 PHR trigger detection unit
206 PHR notification control unit
301 DL signal transmission unit
302 UL signal reception unit
303 RRC management unit
304 parameter determination unit
305 inter-base station communication unit

The invention claimed is:

1. A user apparatus in a mobile communication system including a first base station and a second base station that perform communication with the user apparatus by dual connectivity, comprising:
   a reception unit configured to receive, from the first base station, a detection parameter for a Master Cell Group (MCG), on uplink transmission power reporting, set for the MCG that is a cell group of the first base station, and a detection parameter for a Secondary Cell Group (SCG), on uplink transmission power reporting, set for the SCG that is a cell group of the second base station; and
   a report control unit configured to report uplink transmission power information to one of or both of the first base station and the second base station when detecting a report trigger of the uplink transmission power information in an activated cell in a cell group of the MCG and the SCG by a detection parameter of the detection parameter for the MCG and the detection parameter for the SCG,
   wherein the uplink transmission power information that is reported includes uplink transmission power information of each cell in the first base station, and uplink transmission power information of each cell that includes a Primary Secondary Cell (PSCell) in the second base station, and
   wherein, when detecting the report trigger by the detection parameter for the MCG, the report control unit reports the uplink transmission power information to the first base station, and when detecting the report trigger by the detection parameter for the SCG, the report control unit reports the uplink transmission power information to the second base station.

2. The user apparatus as claimed in claim 1, wherein the uplink transmission power information is power headroom.

3. An uplink transmission power reporting method executed by a user apparatus in a mobile communication system including a first base station and a second base station that perform communication with the user apparatus by dual connectivity, comprising:
   a reception step of receiving, from the first base station, a detection parameter for a Master Cell Group (MCG), on uplink transmission power reporting, set for the MCG that is a cell group of the first base station, and a detection parameter for a Secondary Cell Group (SCG), on uplink transmission power reporting, set for the SCG that is a cell group of the second base station; and
   a report control step of reporting uplink transmission power information to one of or both of the first base station and the second base station when detecting a report trigger of the uplink transmission power information in an activated cell in a cell group of the MCG and the SCG by a detection parameter of the detection parameter for the MCG and the detection parameter for the SCG,
   wherein the uplink transmission power information that is reported includes uplink transmission power information of each cell in the first base station, and uplink transmission power information of each cell that includes a Primary Secondary Cell (PSCell) in the second base station, and
   wherein, when detecting the report trigger by the detection parameter for the MCG, the user apparatus reports the uplink transmission power information to the first base station, and when detecting the report trigger by the detection parameter for the SCG, the user apparatus reports the uplink transmission power information to the second base station.

4. The method as claimed in claim 3, wherein the uplink transmission power information is power headroom.

* * * * *